United States Patent Office 2,888,458
Patented May 26, 1959

2,888,458

SALICYLALDEHYDE AND VANILLIN SCHIFF BASE DERIVATIVES OF CERTAIN AMINO-ALKYL CYCLIC AMIDINES

Verner L. Stromberg, Shrewsbury, Mo., assignor to Petrolite Corporation, Wilmington, Del., a corporation of Delaware No Drawing. Original application December 30, 1954, Serial No. 478,934, now Patent No. 2,854,322, dated September 30, 1958. Divided and this application October 17, 1957, Serial No. 690,619

6 Claims. (Cl. 260—240)

This application is a division of my copending application Serial No. 478,934, filed December 30, 1954, now U.S. Patent 2,854,322, dated September 30, 1958.

The present invention is concerned with certain new heterocyclic compounds and method of making same. Such compounds have utility in various arts, not only as such but after being converted into derivatives of the kind hereinafter described.

More specifically, the new compounds are obtained by reaction involving a cyclic amidine having a terminal primary amino radical and salicylaldehyde or vanillin. The invention may be illustrated by a compound such as the following:

The above compound was derived from the imidazoline obtained from salicyclic acid and diethylene triamine with subsequent reaction with salicylaldehyde.

The acid used for combination with the polyamine, such as diethylene triamine, may be a noncyclic acid such as stearic acid. The structure of a product so obtained is shown by the following formula:

The products of the kind herein described may be subjected to hydrogenation and the hydrogenated derivatives are equally valuable for the herein described purpose. The hydrogenated derivatives of the two compounds described above correspond to the following structures:

Reference to hydrogenation means the conversion of the Schiff's Base to the amine and may or may not include hydrogenation of the aromatic ring if present.

The above formulas show the compounds derived from a substituted imidazoline, i.e., a five-membered ring compound but it is to be noted that comparable compounds having a six-membered ring are included. Such compounds instead of being derivatives of substituted imidazolines are derivatives of substituted tetrahydropyrimidines. Both types of cyclic compounds, of course, belong to the broader class of cyclic amidines.

The compounds above depicted are derivatives of diethylene triamine but one can use derivatives of higher alkylene amines such as triethylene tetramine, tetraethylene pentamine, etc. In such instances the secondary divalent amino radical, such as $$-C_2H_4\overset{H}{N}-$$

would appear in the radical which links the heterocyclic ring with the hydroxylated aldehyde.

The type of compound herein depicted is not limited to monocarboxy acids, such as acetic acid and higher fatty acids, but includes dicarboxy acids such as diglycolic acid, dimeric fatty acids obtained by the dimerization of unsaturated higher fatty acids such as linseed oil fatty acid, etc.

More specifically then, the herein described amidines may be exemplified by the formula in which $$R-C\overset{\diagup}{\diagdown}$$

is the residue of a monocarboxy acid, and R' is a member of the class consisting of $$-CH_2CH_2-$$

$$-CH_2CH_2CH_2-$$

$$-\overset{H}{\underset{|}{C}}-CH_2-$$
$$\phantom{-}CH_3$$

$$\phantom{-}CH_3$$
$$-CH_2-\overset{|}{C}H-CH_2-$$

$$\overset{H}{\underset{H}{H\overset{|}{C}H}}\phantom{--}\overset{H}{\underset{H}{H\overset{|}{C}H}}$$
$$-\overset{|}{\underset{H}{C}}-\!\!-\!\!-\!\!-\overset{|}{\underset{H}{C}}-$$

in which R" is a radical selected from the class consisting of R'NH₂ or $$(-R'\overset{H}{N}-)_nH$$

in which R has its prior significance and n is a small whole number. The amino cyclic amidine above depicted is combined with a suitable aldehyde such as salicylaldehyde.

If, however, the cyclic amidine is derived from a dicarboxy acid, such as HOOC—R₁—COOH in which R₁ is the carboxyl-free dicarboxy acid residue, the dicyclic amidine obtained would correspond to in which the various characters have their prior significance.

In recapitulation then, the present invention is concerned with certain Schiff's Bases and hydrogenated derivatives thereof. The Schiff's Bases are obtained by reaction between (A) a member of the class consisting of (a) substituted imidazolines and substituted tetrahydropyrimidines, characterized by the presence of a terminal primary amino group, and (b) substituted diimidazolines and substituted ditetrahydropyrimidines characterized by the presence of 2 terminal primary amino groups, and (B) at least one mole salicylaldehyde or vanillin.

For convenience, what is said hereinafter will be divided into eight parts:

Part 1 is concerned with suitable cyclic compounds containing a primary amino group in the terminal position. Part 1, for convenience, is divided into four divisions:

Division A is concerned with substituted imidazolines obtained from monocarboxy acids;

Division B is concerned with suitable substituted tetrahydropyrimidines obtained from monocarboxy acids;

Division C is concerned with substituted imidazolines obtained from dicarboxy acids;

Division D is concerned with substituted tetrahydropyrimidines obtained from dicarboxy acids;

Part 2 is concerned with suitable carbonyl compounds, i.e. salicylaldehyde and vanillin.

Part 3 is concerned with the reaction involving the first two classes enumerated above.

Part 4 is concerned with hydrogated derivatives of the compounds described in Part 3, preceding.

Part 5 is concerned with the use of the hereindescribed products for inhibiting the catalytic oxidation of an organic substance caused by a metal such as copper, and other similar metals or compounds. Stated another way, these compounds are valuable as metal deactivators particularly for use in combination with commercial anti-oxidants as employed in the petroleum industry. Such application is described in detail in Part 5.

Part 6 is concerned with the same application as in Part 5, preceding, except that the herein described compounds are employed in combination with other well known metal deactivators with the result that one obtains an unlooked for and synergistic effect at a lower cost than is otherwise possible.

Part 7 is concerned with the uses for the products obtained in Parts 3 and 4 preceding, but for applications other than those described in Parts 5 and 6, preceding.

Part 8 is concerned with derivatives obtained from the compounds described in Parts 3 and 4, preceding, in which such compound serves as an intermediate for further reaction.

PART 1

The manufacture of cyclic amidines and particularly substituted imidazolines and substituted tetrahydropyrimidines is well known. The production of such compounds has been described extensively in the patent literature and elsewhere. See Chemical Reviews, volume 54, No. 4, page 593. See also Imidazole and Its Derivatives, Part 1(1953), Hoffmann, Interscience Publishers, New York.

Imidazolidines are obtained in various ways including the preparation from imidazolines. For convenience, they will be referred to as dihydroimidazolines. Likewise, hexahydropyrimidines are readily obtainable from tetrahydropyrimidines.

Division A

Substituted imidazolines are obtained from a variety of acids beginning with the one one-carbon acid (formic) through and including higher fatty acids or the equivalent having as many as 30 carbon atoms. Modified fatty acids also can be employed, as for example, phenyl stearic acid or the like. Cyclic acids may be employed, including naphthenic acids. A variety of other acids including benzoic acid, substituted benzoic acid, salicyclic acid and the like, have been employed to furnish the residue RC from the acid RCOOH in which the C of the residue RC is part of the ring. The fatty acids employed for example, may be saturated or unsaturated. They may be hydroxylated or nonhydroxylated. Branched long chain fatty acids may be employed. See J. Am. Chem. Soc., 74, 2523 (1952). This applies also to the lower molecular weight acids as well.

It will be noted that a variety of substituted imidazolines are included in Table 1 following. In some instances there is a radical having 8 or more uninterrupted carbon atoms and in other instances this is not the case.

Actually, substituted imidazolines can be obtained from a variety of polyamines but only in the instance where one starts with a triamine or higher amine is there a residual group having a primary amino radical as herein required. This does not mean, however, that one could not start with ethylene diamine or with 1,2-propylene diamine. The cyclic compounds so obtained could be reacted with a mole of ethylene imine or propylene imine so as to introduce the terminal primary amino group. From a practical standpoint, however, the most readily available polyamines are diethylene triamine, triethylene tetramine, and tetraethylene pentamine. No particular advantage has been found in using other polyamines in which some other divalent radical, such as

appears. For this reason examples in Table 1 are limited to derivatives of the three most readily available polyamines above indicated.

TABLE 1

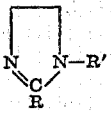

| Ex. No. | RCOOH Source of RC | R' |
|---|---|---|
| 1a | Formic | CH₂CH₂NH₂ |
| 2a | Propionic | CH₂CH₂NH₂ |
| 3a | Isovaleric | CH₂CH₂NH₂ |
| 4a | Stearic | CH₂CH₂NH₂ |
| 5a | Melissic | CH₂CH₂NH₂ |
| 6a | Phenyl Stearic | CH₂CH₂NH₂ |
| 7a | Salicylic | CH₂CH₂NH₂ |
| 8a | Cresotinic | CH₂CH₂NH₂ |
| 9a | Naphthenic | CH₂CH₂NH₂ |
| 10a | Oleic | CH₂CH₂NHCH₂CH₂NH₂ |
| 11a | Acetic | CH₂CH₂NHCH₂CH₂NH₂ |
| 12a | Pelargonic | CH₂CH₂NHCH₂CH₂NH₂ |
| 13a | Lauric | CH₂CH₂NHCH₂CH₂NH₂ |
| 14a | Palmitic | CH₂CH₂NHCH₂CH₂NH₂ |
| 15a | Cerotic | CH₂CH₂NHCH₂CH₂NH₂ |
| 16a | p-tert-Butyl benzoic | CH₂CH₂NHCH₂CH₂NH₂ |
| 17a | p-Hydroxybenzoic | CH₂CH₂NHCH₂CH₂NH₂ |
| 18a | Salicylic | CH₂CH₂NHCH₂CH₂NH₂ |
| 19a | Hydroxy naphthenic | CH₂CH₂NHCH₂CH₂NH₂ |
| 20a | Benzoic | CH₂CH₂NHCH₂CH₂NH₂ |
| 21a | Formic | CH₂CH₂NCH₂H₂CH₂NHCH₂CH₂NH₂ |
| 22a | Methyloctadecanoic | CH₂CH₂NCH₂H₂CH₂NHCH₂CH₂NH₂ |
| 23a | Capric | CH₂CH₂NCH₂H₂CH₂NHCH₂CH₂NH₂ |
| 24a | Stearic | CH₂CH₂NCH₂H₂CH₂NHCH₂CH₂NH₂ |
| 25a | Phenylstearic | CH₂CH₂NCH₂H₂CH₂NHCH₂CH₂NH₂ |
| 26a | Cresotinic | CH₂CH₂NCH₂H₂CH₂NHCH₂CH₂NH₂ |
| 27a | Linoleic | CH₂CH₂NHC₂H₂CH₂NHCH₂CH₂NH₂ |
| 28a | Salicylic | CH₂CH₂NHC₂H₂CH₂NHCH₂CH₂NH₂ |
| 29a | 2-hydroxy-3-methoxybenzoic | CH₂CH₂NHC₂H₂CH₂NHCH₂CH₂NH₂ |
| 30a | Naphthenic | CH₂CH₂NHC₂H₂CH₂NHCH₂CH₂NH₂ |

Division B

The only polyamine available on a large scale for the manufacture of tetrahydropyrimidines is 3,3'-iminobispropylamine. This product can be converted into the tetramine or pentamine by appropriate reaction with a suitable imine, or by reaction with acrylonitrile followed by the usual steps of converting the intermediate into the amine. Tetrahydropyrimidines comparable to the substituted amidines in Table 1, appear in Table 2 immediately following.

TABLE 2

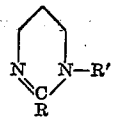

| Ex. No. | RCOOH source of RC | R' |
|---|---|---|
| 1b | Formic | $CH_2CH_2CH_2NH_2$ |
| 2b | Acetic | $CH_2CH_2CH_2NH_2$ |
| 3b | Butyric | $CH_2CH_2CH_2NH_2$ |
| 4b | Valeric | $CH_2CH_2CH_2NH_2$ |
| 5b | Isovaleric | $CH_2CH_2CH_2NH_2$ |
| 6b | Trimethyl acetic | $CH_2CH_2CH_2NH_2$ |
| 7b | Pelargonic | $CH_2CH_2CH_2NH_2$ |
| 8b | Lauric | $CH_2CH_2CH_2NH_2$ |
| 9b | Stearic | $CH_2CH_2CH_2NH_2$ |
| 10b | Arachidic | $CH_2CH_2CH_2NH_2$ |
| 11b | Eucosane-carboxylic | $CH_2CH_2CH_2NH_2$ |
| 12b | Cerotic | $CH_2CH_2CH_2NH_2$ |
| 13b | Melissic | $CH_2CH_2CH_2NH_2$ |
| 14b | Phenylstearic | $CH_2CH_2CH_2NH_2$ |
| 15b | Benzoic | $CH_2CH_2CH_2NH_2$ |
| 16b | Salicylic | $CH_2CH_2CH_2NH_2$ |
| 17b | Cresotinic | $CH_2CH_2CH_2NH_2$ |
| 18b | P-Hydroxybenzoic | $CH_2CH_2CH_2NH_2$ |
| 19b | P-tert-butylbenzoic | $CH_2CH_2CH_2NH_2$ |
| 20b | 2-hydroxy-3-methoxy benzoic | $CH_2CH_2CH_2NH_2$ |
| 21b | Oleic | $CH_2CH_2CH_2NH_2$ |
| 22b | Undecylenic | $CH_2CH_2CH_2NH_2$ |
| 23b | Linoleic | $CH_2CH_2CH_2NH_2$ |
| 24b | Hydroxybutyric | $CH_2CH_2CH_2NH_2$ |
| 25b | Methyloctadecanoic | $CH_2CH_2CH_2NH_2$ |

*Division C*

The procedure employed in the manufacture of substituted imidazolines from dicarboxy acids is comparable to that employed when monocarboxy acids are used as reactants. As in the case of the monocarboxy acids, the acid may introduce a radical having less than 8 uninterrupted carbon atoms or 8 or more uninterrupted carbon atoms. Suitable products derived from the three amines peviously noted are described in Table 3, following.

TABLE 3

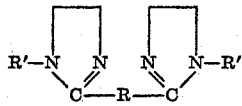

| Ex. No. | HOOC—R—COOH Source of —CRC— | R' |
|---|---|---|
| 1c | Malonic | $CH_2CH_2NH$ |
| 2c | Adipic | $CH_2CH_2NH$ |
| 3c | Suberic | $CH_2CH_2NH$ |
| 4c | Sebacic | $CH_2CH_2NH$ |
| 5c | Nonodecane dicarboxylic | $CH_2CH_2NH$ |
| 6c | Diglycolic | $CH_2CH_2NH$ |
| 7c | Ethylene bix (glycolic) | $CH_2CH_2NH$ |
| 8c | Methylene disalicyclic | $CH_2CH_2NH$ |
| 9c | Stearyl malonic | $CH_2CH_2NH$ |
| 10c | Phthalic | $CH_2CH_2NH$ |
| 11c | Succinic | $CH_2CH_2NHCH_2CH_2NH$ |
| 12c | Glutaric | $CH_2CH_2NHCH_2CH_2NH$ |
| 13c | Pimelic | $CH_2CH_2NHCH_2CH_2NH$ |
| 14c | Azelaic | $CH_2CH_2NHCH_2CH_2NH$ |
| 15c | Eicosane dicarboxylic | $CH_2CH_2NHCH_2CH_2NH$ |
| 16c | Dilinoleic | $CH_2CH_2NHCH_2CH_2NH$ |
| 17c | Isophthalic | $CH_2CH_2NHCH_2CH_2NH$ |
| 18c | Diglycolic | $CH_2CH_2NHCH_2CH_2NH$ |
| 19c | Lauryl malonic | $CH_2CH_2NHCH_2CH_2NH$ |
| 20c | Methylene disalicylic | $CH_2CH_2NHCH_2CH_2NH$ |
| 21c | Malonic | $CH_2CH_2NHC_2H_2CH_2NHCH_2CH_2NH_2$ |
| 22c | Succinic | $CH_2CH_2NHC_2H_2CH_2NHCH_2CH_2NH_2$ |
| 23c | Suberic | $CH_2CH_2NHC_2H_2CH_2NHCH_2CH_2NH_2$ |
| 24c | Pimelic | $CH_2CH_2NHC_2H_2CH_2NHCH_2CH_2NH_2$ |
| 25c | Nonodecane dicarboxylic | $CH_2CH_2NHC_2H_2CH_2NHCH_2CH_2NH_2$ |
| 26c | Diglycolic | $CH_2CH_2NHC_2H_2CH_2NHCH_2CH_2NH_2$ |
| 27c | Methylene disalicylic | $CH_2CH_2NHC_2H_2CH_2NHCH_2CH_2NH_2$ |
| 28c | Stearyl malonic | $CH_2CH_2NHC_2H_2CH_2NHCH_2CH_2NH_2$ |
| 29c | Stearyl succinic | $CH_2CH_2NHC_2H_2CH_2NHCH_2CH_2NH_2$ |
| 30c | Terephthalic | $CH_2CH_2NHC_2H_2CH_2NHCH_2CH_2NH_2$ |

Other polycarboxy acids having 3 or 4 carboxyl radicals, such as aconitic acid, tetracarboxybutane, tricarballylic acid, etc., may be employed.

*Division D*

In the use of dicarboxy acids the bulk of the examples were obtained from 3,3'-iminobispropylamine. These compounds are comparable to those which appeared in Table 3, preceding.

TABLE 4

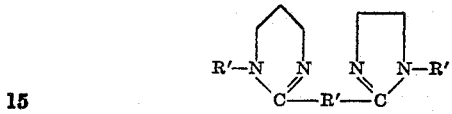

| Ex. No. | HOOC—R—COOH Source of —CRC— | R' |
|---|---|---|
| 1d | Malonic | $CH_2CH_2CH_2NH_2$ |
| 2d | Succinic | $CH_2CH_2CH_2NH_2$ |
| 3d | Glutaric | $CH_2CH_2CH_2NH_2$ |
| 4d | Adipic | $CH_2CH_2CH_2NH_2$ |
| 5d | Suberic | $CH_2CH_2CH_2NH_2$ |
| 6d | Sebacic | $CH_2CH_2CH_2NH_2$ |
| 7d | Pimelic | $CH_2CH_2CH_2NH_2$ |
| 8d | Azelaic | $CH_2CH_2CH_2NH_2$ |
| 9d | Nonodecane dicarboxylic | $CH_2CH_2CH_2NH_2$ |
| 10d | Eicosane dicarboxylic | $CH_2CH_2CH_2NH_2$ |
| 11d | Diglycolic | $CH_2CH_2CH_2NH_2$ |
| 12d | Ethylene bisglycolic | $CH_2CH_2CH_2NH_2$ |
| 13d | Methylene disalicylic | $CH_2CH_2CH_2NH_2$ |
| 14d | Dilinoleic | $CH_2CH_2CH_2NH_2$ |
| 15d | Stearyl malonic | $CH_2CH_2CH_2NH_2$ |
| 16d | Lauryl succinic | $CH_2CH_2CH_2NH_2$ |
| 17d | Isotetradecyl succinic | $CH_2CH_2CH_2NH_2$ |
| 18d | Phthalic | $CH_2CH_2CH_2NH_2$ |
| 19d | Isophthalic | $CH_2CH_2CH_2NH_2$ |
| 20d | Terephthalic | $CH_2CH_2CH_2NH_2$ |
| 21d | Glutaconic | $CH_2CH_2CH_2NH_2$ |
| 22d | Maleic | $CH_2CH_2CH_2NH_2$ |

PART 2

Suitable carbonyl compounds are salicylaldehyde and vanillin. The preferred reactant is o-vanillin.

PART 3

The two types of reactants previously described in Parts 1 and 2 are combined under conventional conditions to produce a Schiff's Base compound. Generally, the conditions require preferably a solvent in which both reactants are soluble, which allows the reaction to proceed at a lower temperature giving a lighter colored product. The reaction may be allowed to proceed in the absence of solvent, however, eliminating the necessity of solvent removal from the viscous reaction product. This necessitates longer reaction times or higher temperatures being employed.

The procedure employed in obtaining the Schiff's Base is illustrated by the following examples:

Example 1e

One mole of the imidazoline (Ex. 1a, Table 1) derived from formic acid was mixed with one mole of salicylaldehyde at room temperature. The reaction mixture immediately became hot and some of the water produced in the reaction was noted escaping. Stirring was continued 30 minutes and the water formed removed in vacuo. A dark red product resulted.

Example 2e

One mole of the imidazoline derived from salicylic acid was mixed with one mole of o-vanillin and sufficient methanol added to ensure homogeneity. The solution was refluxed for 60 minutes. The solvent and the water formed in the reaction were then removed in vacuo from the brown-red viscous oil.

For sake of brevity a number of other examples are included in Table 5 following. It will be noted in these examples, 1e to 20e, there are included a variety of compounds some of which include a high molal radical, and some of which do not. In some instances the compounds contain a single heterocyclic ring and in some instances 2 heterocyclic rings. In some instances the rings are five membered and in other instances six membered. Some examples are characterized by the presence of a free uncombined terminal primary amino radical.

The derivatives having a single heterocyclic ring may be characterized by a formula which appears at the top of Table 6, following. The tabular data refers to either compounds previously noted or referred to, or else other compounds which have been made to illustrate the present invention.

As has been pointed out previously, the herein described compounds need not be derivatives of monocarboxy acids but may be derivatives of dicarboxy acids or, for that matter, tricarboxy acids, and thus include compounds having 2 or more heterocyclic rings.

Reference is made to Table 7 following, in which reference is made to the polycyclic compounds which illustrate the present invention. For numerous reasons I prefer to employ derivatives derived from monocarboxy acids, or if polycarboxy acids are used, to use the dicarboxy acids. The tabular data give some examples illustrating the structural formula which appears at the head of Table 7.

TABLE 6

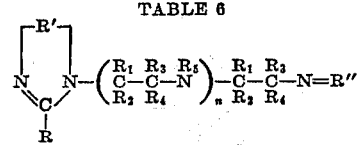

[n=0, 1, 2, 3.]

| R | $R_1$ | $R_2$ | $R_3$ | $R_4$ | $R_5$ | n | R″ |
|---|---|---|---|---|---|---|---|
| H | H | H | H | H | --- | 0 | o-Hydroxybenzylidene. |
| H | H | H | H | H | --- | 0 | 2-hydroxy-3-methoxy benzylidene. |
| $CH_3$ | H | H | H | H | --- | 0 | o-Hydroxybenzylidene. |
| $CH_3$ | H | H | H | H | --- | 0 | 2-hydroxy-3-methoxy benzylidene. |
| o-Hydroxy-phenyl | H | H | H | H | --- | 0 | o-Hydroxybenzylidene. |
| Do | H | H | H | H | --- | 0 | 2-hydroxy-3-methoxy benzylidene. |
| H | H | H | H | H | H | 1 | o-Hydroxybenzylidene. |
| H | H | H | H | H | H | 1 | 2-hydroxy-3-methoxy benzylidene. |
| o-Hydroxy-phenyl | H | H | H | H | H | 1 | o-Hydroxybenzylidene. |
| Do | H | H | H | H | H | 1 | 2-hydroxy-3-methoxy benzylidene. |
| 2-hydroxy-3-methyl phenyl | H | H | H | H | --- | 0 | 2-hydroxybenzylidene. |
| Do | H | H | H | H | H | 1 | o-Hydroxybenzylidene. |
| 2-hydroxy-3-methoxy phenyl | H | H | H | H | --- | 0 | Do. |
| Do | H | H | H | H | H | 1 | Do. |

TABLE 5

| Ex. No. | Cyclic cmpd. used | Moles | Carbonyl component used | Moles | Molar ratio | Solvent | Temp., °C. | Min. |
|---|---|---|---|---|---|---|---|---|
| 1e | 1a | 1 | Salicylaldehyde | 1 | 1:1 | None | 20 | 30 |
| 2e | 18a | 1 | o-Vanillin | 2 | 1:1 | Methanol | 65 | 60 |
| 3e | 4a | 1 | Salicylaldehyde | 1 | 1:1 | do | 65 | 60 |
| 4e | 10a | 1 | o-Vanillin | 1 | 1:1 | do | 65 | 60 |
| 5e | 11a | 1 | do | 1 | 1:1 | do | 65 | 60 |
| 6e | 29a | 1 | do | 1 | 1:1 | do | 65 | 60 |
| 7e | 2b | 1 | do | 1 | 1:1 | do | 65 | 60 |
| 8e | 24b | 1 | Salicylic | 1 | 1:1 | do | 65 | 60 |
| 9e | 1c | 1 | o-Vanillin | 2 | 1:2 | do | 65 | 60 |
| 10e | 6c | 1 | do | 2 | 1:2 | do | 65 | 60 |
| 11e | 18c | 1 | do | 2 | 1:2 | Xylene | 140 | 60 |
| 12e | 27c | 1 | do | 2 | 1:2 | Isopropanol | 83 | 120 |
| 13e | 4d | 1 | Salicylaldehyde | 2 | 1:2 | do | 83 | 90 |
| 14e | 14d | 1 | do | 1 | 1:1 | do | 83 | 120 |
| 15e | 20d | 1 | do | 2 | 1:2 | do | 83 | 120 |
| 16e | 8d | 1 | do | 2 | 1:2 | do | 83 | 120 |
| 17e | 19b | 1 | o-Vanillin | 1 | 1:1 | do | 83 | 90 |

TABLE 7

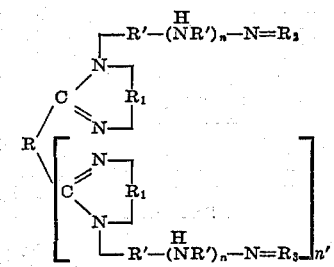

R=carboxyl free residue of a polycarboxy acid $R_1$ and $R'$ = $-CH_2-CH_2-$, $-CH_2-CH_2-CH_2$ $$-CH_2-\overset{CH_3}{\underset{|}{CH}}- \quad -\overset{CH_3}{\underset{|}{CH}}-\overset{CH_3}{\underset{|}{CH}}-$$

$R_2$=carbonyl free residue of salicylaldehyde or vanillin
$R_3$=$H_2$ or $R_2$
n=whole number including zero
n′=whole number not greater than two and including zero

| R | R₁ | R' | R₂ | R₃ | $n$ | $n'$ |
|---|---|---|---|---|---|---|
| Malonic residue | —CH₂CH₂— | —CH₂CH₂— | Salicylaldehyde residue | Salicylaldehyde residue | 0 | 1 |
| Adipic residue | —CH₂CH₂CH₂— | —CH₂CH₂CH₂— | ----do---- | ----do---- | 0 | 1 |
| Dilinoleic residue | —CH₂CH₂— | —CH₂CH₂— | o-Vanillin residue | o-Vanillin residue | 1 | 1 |
| Diglycolic residue | —CH₂CH₂— | —CH₂CH₂— | Salicylaldehyde residue | Salicylaldehyde residue | 1 | 1 |
| Terephthalic residue | —CH₂CH₂— | —CH₂CH₂— | o-Vanillin residue | o-Vanillin residue | 2 | 1 |

PART 4

A variety of primary amines have been combined with glucose or the like to produce a compound comparable to the one herein described, in that it is a Schiff's Base. Such compounds have been described in various patents such as:

U.S. Patent No. 1,985,424, dated December 25, 1934, to Piggott

U.S. Patent No. 2,016,962, dated October 8, 1935, to Flint et al.

U.S. Patent No. 2,016,963, dated October 8, 1935, to Flint et al.

U.S. Patent No. 2,193,433, dated March 12, 1940, to Salzberg

Using the same hydrogenation procedure in regard to the compounds described in Part 3, preceding, one can readily convert the Schiff's Base into suitable amines which have certain advantages in instances over the Schiff's Base, in that they have greater stability. It should be pointed out that when such reactants as described in Part 1, preceding, are subjected to hydrogenation if derived from an unsaturated fatty acid or unsaturated dicarboxy acid, the conversion to the corresponding saturated compound takes place. Thus, the hydrogenated derivatives referred to in the appended claims include not only those in which the Schiff's Base has been converted into the corresponding amine but also those in which any unsaturated groups derived from mono- or dicarboxy acids have been converted into the corresponding saturated compound.

As a specific example illustrating the hydrogenation of the Schiff's Base obtained as previously described in Part 3, reference is made to the following three examples and Table 8, following. It will be noted that procedure employed is substantially the one described in United States patents preceding.

Example 1f 100 grams of the Schiff's Base (Ex. 1e, Table 5) derived from formic acid, diethylene triamine, and salicylaldehyde dissolved in 500 grams of anhydrous ethyl alcohol, and 10 grams of reduced nickel catalyst (20% nickel on carbon), was agitated under 2000 pounds' hydrogen pressure at a temperature of 70° for 50 minutes. The catalyst was removed by filtration and the mother liquor concentrated giving the reduced Schiff's Base as a viscous non-crystalline syrup.

Example 2f 100 grams of the Schiff's Base (Ex. 9e, Table 5) derived from o-vanillin, diethylene triamine, and malonic acid dissolved in anhydrous ethyl alcohol, and 10 grams of reduced nickel catalyst (20% on carbon), was agitated under 2000 pounds hydrogen pressure at a temperature of 100° for 60 minutes. The catalyst was removed by filtration and the mother liquor concentrated, giving the product as a viscous non-crystalline syrup.

Example 3f 100 grams of the Schiff's Base (Ex. 17e, Table 5 derived from o-vanillin, p-tert-butylbenzoic acid, and 3,3'-iminobispropylamine dissolved in anhydrous ethyl alcohol and 10 grams of Raney nickel catalyst, was violently agitated under 75 pounds pressure at a temperature of 50° for 30 minutes. The catalyst was removed and the mother liquor concentrated, giving a semi-solid viscous oil.

TABLE 8

| Ex. No. | Cmpd., hydrogenated | Grams | Catalyst | Temp., °C. | Pres., lbs. sq. in. | Time, minutes |
|---|---|---|---|---|---|---|
| 1f | 1e | 100 | Supported nickel | 70 | 2,000 | 50 |
| 2f | 9e | 100 | ----do---- | 100 | 2,000 | 120 |
| 3f | 17e | 100 | Raney nickel | 50 | 75 | 30 |
| 4f | 2e | 100 | Supported nickel | 100 | 2,000 | 60 |
| 5f | 3e | 100 | ----do---- | 100 | 2,000 | 60 |
| 6f | 8e | 100 | ----do---- | 100 | 2,000 | 90 |
| 7f | 10e | 100 | ----do---- | 100 | 2,000 | 120 |
| 8f | 12e | 100 | ----do---- | 100 | 2,000 | 150 |
| 9f | 15e | 100 | ----do---- | 100 | 2,000 | 150 |

The products described in Parts 3 and 4 may vary widely in regard to surface-active properties and particularly as far as solubility in water, or similar polar solvents go on the one hand, and hydrocarbons, oils, or non-polar solvents on the other hand. A number of the products described and, in fact, all of them either before or after hydrogenation, have present one or more basic nitrogen atoms per molecule. Thus, they may be employed in the various forms in which comparable nitrogenous compounds are used, i.e., in the form of the anhydrous base, or in the form of the hydrated base (combination with water) or in the form of a salt. The salt may be a combination with an organic acid or an inorganic acid such as hydrochloric acid, phosphoric acid, nitric acid, sulfuric acid, etc. The acid employed, may be a carboxy acid or sulfonic acid. Furthermore, the acid may have more than one carboxyl group as in the case diglycolic acid, tetracarboxybutane, etc.

When a salt is formed from a low molal organic acid, particularly a hydroxylated acid such as acetic acid, butyric acid, lactic acid, hydroxyacetic acid, gluconic acid, etc., the tendency is to increase the hydrophile properties. However, when a salt is derived from an organic acid having 8 or more carbon atoms, such as a higher fatty acid, naphthenic acid, abietic acid, or the like, the tendency is to decrease the hydrophile properties and increase the hydrophobe properties.

Any reference to the use of these acylation derivatives, as for example in the claims, specifically includes all the various forms including the salt form and the hydrated base form referred to above, as well as the anhydrous base.

Attention is directed to the fact that the herein described compounds, either alone or in combination with other well known stabilizers, may be used for various purposes for which such compounds are used in connection with organic materials. In other words, the compounds may be employed for stabilization of any kind of organic compound which tends to deteriorate in storage or in use due to oxidation reactions. Various organic compounds, including motor fuel and particularly cracked gasoline and polymer gasoline, mineral oil, lubricating oil, fuel oil, drying oil, greases, rubber, edible fats and oils, etc., are adversely affected by oxygen, with the resultant formation of undesirable gum, discoloration, rancidity, or other deleterious reactions.

However, the more important use of these compounds is in the field of hydrocarbon fuels for use as stabilizer compositions and particularly metal deactivators. In such applications, surface active properties are of comparatively little import but solubility in a hydrocarbon is very important. Thus, the preference is to select such compounds as herein described, particularly in Parts 5 and 6, which are oil-soluble within the proportions employed or at least oil-soluble when converted into a salt, such as the salt obtained from oleic acid, stearic acid, naphthenic acid, dimeric acid, etc. For this reason, as pointed out previously, reference to compositions in which the herein described products represent a part of a hydrocarbon fuel or the like, such terminology includes the salt form as well as the free base.

PART 5

As has been pointed out previously, Part 5 is concerned with the use of the herein described products for inhibiting catalytic oxidation of an organic substance caused by a metal such as copper and other similar compounds. These compounds are valuable as metal deactivators in the petroleum industry, particularly in use with gasoline, motor fuel, kerosene and the like.

As is well known, the amount of copper deactivator added is comparatively small, with the range of .0001% to 0.5%. The use of such materials is well known and has been described in a large number of patents. The method of testing such metal deactivators is conventional and has been described in A.S.T.M. D-525.

Tests were conducted in the manner described in the above reference and the results appear in the following table.

TABLE 9.—THE EFFECT OF COPPER DEACTIVATORS

The deactivators were tested in gasoline containing 0.002% butylaminophenol as an antioxidant and 1 p.p.m. Cu, added as copper oleate.

| No. | Deactivator | Conc., wt. percent | Induction, minutes |
|---|---|---|---|
| 1z | None | | 70 |
| 2z | 1 - aminoethylimidazoline - o - vanillin product | 0.001 | 390 |
| 3z | ---do--- | 0.002 | 450 |
| 4z | 1-aminoethylimidazoline salicylaldehyde product | 0.001 | 360 |
| 5z | 1 - aminoethyl - 2 - methyl imidazoline salicylaldehyde product | 0.001 | 315 |
| 6z | 1 - aminoethyl - 2 - (2 - hydroxyphenyl) imidazoline salicylaldehyde product | 0.001 | 370 |
| 7z | 1 - aminoethyl - 2 - (2 - hydroxyphenyl) imidazoline o-vanillin product | 0.001 | 390 |
| 8z | ---do--- | 0.002 | 450 |
| 9z | N - aminoethyl - 1 - aminoethylimidazoline o-vanillin product | 0.001 | 465 |
| 10z | N - aminoethyl - 1 - aminoethylimidazoline salicylaldehyde product | 0.001 | 445 |

PART 6

As has been pointed out previously, Part 6 is concerned with the same application as in Part 5, preceding, except that the herein described compounds are employed in combination with other well known metal deactivators, with the result that one obtains an unlooked for and synergistic effect, thus resulting in a lower cost than is otherwise possible. The synergistic effect on certain combinations appearing in Table 9 are shown in Table 10 immediately following. The test procedure, of course, is the same as in connection with data presented in Table 9. As to the synergistic effect in connection with well known copper deactivators, such as disalicylal propylene diimine, and disalicylal ethylene diimine, reference is made to Table 11, following. Here again the method of testing was the same as in connection with Tables 9 and 10.

TABLE 10.—SYNERGISTIC EFFECT OF COPPER DEACTIVATORS

| No. | Deactivator | Ratio | Total conc., weight percent | Induction, minutes |
|---|---|---|---|---|
| 1y | 2z—6z | 1:1 | 0.001 | 495 |
| 2y | 2z—7z | 1:1 | 0.001 | 480 |
| 3y | 2z—9z | 1:1 | 0.001 | 490 |
| 4y | 6z—9z | 1:1 | 0.001 | 450 |

TABLE 11.—EFFECT OF COPPER DEACTIVATORS ON COMMERCIAL DEACTIVATORS

| No. | Deactivator | Ratio | Total conc., weight percent | Induction, minutes |
|---|---|---|---|---|
| 1z | Disalicylal propylene di-imine | | 0.001 | 595 |
| 2z | Disalicylal propylene di-imine plus 2z | 3:1 | 0.001 | 670 |
| 3z | Disalicylal propylene di-imine plus 2z | 1:1 | 0.001 | 635 |
| 4z | Disalicylal ethylene di-imine | | 0.001 | 615 |
| 5z | Disalicylal ethylene di-imine plus 9z | 3:1 | 0.001 | 640 |
| 6z | Disalicylal ethylene di-imine plus 9z | 1:1 | 0.001 | 580 |

PART 7

In light of what has been said previously, it is obvious that the products as such and their salts, represent complete variation in hydrophobe-hydrophile balance from products which are extremely water-soluble to products which are essentially oil-soluble and have comparatively moderate hydrophile properties.

These products or compounds may be used for various purposes in the oil industry in which other cyclic amidines or cyclic amidine derivatives have been employed. Such uses include, among others, the following: Resolution of water-in-oil emulsions; resolution of oil-in-water emulsions, prevention of corrosion particularly of ferrous equipment; use in the acidization of calcareous structures; use in secondary oil recovery, etc.

As to the use of the herein described products in the same way that conventional demulsifying agents are employed, reference is made to U.S. Patent No. 2,626,929, dated January 27, 1953, to De Groote, and particularly to Part Three. Everything that appears therein applies with equal force and effect to the instance process, noting only that where reference is made to Example 13b in said text beginning in column 15 and ending in column 18, reference should be to Example 5e, herein described.

The new products herein described are useful as wetting, detergent and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles, such as sewage, coal washing waste water, and various trade wastes and the like; as germicides, insecticides, emulsifying agents, as for example, for cosmetics, spray oils, water-repellent textile finishes; as lubricants, etc.

So far as the use of the herein described products goes for the purpose of resolving petroleum emulsions of the water-in-oil type, and also for that matter for numerous other purposes where surface-active materials are effective, and particularly for those uses specified elsewhere herein, it is preferred to employ oxyalkylated derivatives which are obtaned by the use of monoepoxides, in such manner that the derivatives so obtained have sufficient hydrophile character to meet at least the test set forth in U.S. Patent No. 2,499,368, dated March 7, 1950, to De Groote and Keiser. In said patent such test for emulsification using a water-insoluble solvent, generally xylene, is described as an index of surface activity.

The materials herein described, in many instances have a number of uses in the petroleum industry somewhat different from those previously described.

In the first place the material is valuable as a fuel oil additive in the manner described in U.S. Patent No. 2,553,183, dated May 15, 1951, to Caron et al. It can be used in substantially the same proportions or lower proportions and this is particularly true when used in conjunction with a glyoxalidine or amido glyoxalidine.

An analogous use in which these products are equally satisfactory, is that described in U.S. Patent No. 2,665,978, dated January 12, 1954, to Stayner et al. The amount employed is in the same proportion or lesser amounts than referred to in said aforementioned Caron et al. patent.

The second use is for the purpose of inhibiting fogs in hydrocarbon products as described in U.S. Patents Nos. 2,550,981 and 2,550,982, both dated May 1, 1951, and both to Eberz. Here again, it can be used in the same proportions as herein indicated or even small proportions.

A third use is to replace oil soluble petroleum sulfonates, so-called mahogany soaps, in the preparation of certain emulsions or soluble oils or emulsifiable lubricants where such mahogany soaps are employed. The cogeneric mixtures having this peculiar property, serve to replace all or a substantial part of the mahogany soap.

Another use is where the product does not serve as an emulsifying agent alone but serves as an adjunct.

Briefly stated, the fourth use is concerned with use as a coupling agent to be employed with an emulsifying agent. See "The Composition and Structure of Technical Emulsions," J. H. Goodey, Roy. Australian Chem. Inst. J. and Proc., vol. 16, 1949, pp. 47–75. As stated, in the summary of this article, states:

"The technical oil-in-water emulsion is regarded as a system of four components; the dispersion medium, consisting of the highly polar substance water; the disperse phase composed of hydrocarbons or other substances of comparatively weak polarity; the coupling agent, being an oil-soluble substance involving an hydroxyl, carboxyl or similar polar group; and the emulsifying agent, which is a water-soluble substance involving an hydrocarbon radical attached to an ionizable group."

Fifth, these materials have particular utility in increasing the yield of an oil well by various procedures which in essence involve the use of fracturing of the strata by means of liquid pressure. A mixture of these products with oil or oil in combination with a gel former alone, or a gel former and finely divided mineral particles, yields a product which, when it reaches crevices in the strata which are yielding water, form a gelatinous mass of curdy precipitate or solid or semi-solid emulsion of a high viscosity. In any event, it represents a rapid gelling agent for the strata crevices and permits pressure to be applied to fracture the strata without loss of fluid through crevices, openings or the like.

The herein described products and the derivatives thereof, are particularly valuable in flooding processes for recovery of oil from subterranean oil-bearing strata when employed in the manner described in U.S. Patent No. 2,233,381, dated February 25, 1941, to De Groote and Keiser.

The application of imidazolines as sold in the open market has been suggested for a variety of industries, such as the following:

Agriculture: kerosene, phenothiazine, pyrethrum sprays, fungicides, herbicidal oils.

Anti-static treatment: for hotel rugs, hospital floors, automobile upholstery, plastic and wax polishes, wool oils, lubricants for synthetic fibers.

Building materials: water repellent treatment for plaster, concrete, cement, roofing materials, air entrainment, floor sealers, linoleum.

Cosmetics: formulation of anti-perspirants, deodorants, sun screens, hair preparations.

De-emulsifying: in antibiotic extraction, breaking crude oil and water-gas for emulsions.

Detergents: metal cleaning emulsions, lens cleaners, floor oils, dry cleaning detergents, radiator flushes, cesspool acid, boiler scale solvents, germicidal corrosion-inhibited acid detergents for dairies, enamel equipment, toilet bowls.

Leather: flat liquoring oils, pickling, acid degreasing, dye fixative.

Metals: rust preventive oils, cutting oils, water displacing compounds, pickling inhibitor, solvent degreasing.

Paints: for improved adhesion of primers, preventing water spotting in lacquers, anti-skinning, pigment flushing, grinding and dispersing, anti-feathering in inks.

Petroleum: corrosion inhibitor and germicide in flood water treatment, de-emulsifying fuel oil additives, anti-strip agent in asphalt emulsions and cutbacks.

Textiles: in rubberizing, textile oils, dyeing assistants, softening agents.

Miscellaneous: bentonite-amine complexes, metal-amine complexes, preparation of pentachlorphenates, quaternaries, plastisols, and rodent repellents.

This new sub-genus of the broad class of cyclic amidines, is also effective for these same uses, part of which have been referred to previously.

PART 8

The products herein described may be combined with a variety of reactants as chemical intermediates, for instance, with various diepoxides or polyepoxides. They may be combined with a number of other monoepoxides, such as epichlorohydrin, styrene oxide, glycide and methylglycide. They may be reacted with alkyl glycidyl ether, glycidyl isopropyl ether, and glycidyl phenyl ether.

Furthermore, such products may be reacted with alkylene imines, such as ethylene imine or propylene imine, to produce cation-active materials. Instead of an imine, one may employ what is a somewhat equivalent material, to wit, a dialkylaminoepoxypropane of the structure

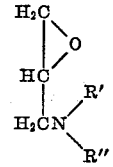

wherein R' and R'' are alkyl groups.

The products may be combined with carboxy acids such as higher fatty acids so as to change their characteristics, or with polycarboxy acids, such is diglycolic, maleic acid, phthalic acid, succinic acid, and the like, to give resins, soft polymers, or fractional esters which are essentially monomeric. Such products and others herein described, may all be used for the resolution of petroleum emulsions of the water-in-oil type. The products without further reaction are particularly valuable as additives for lubricating oils which are derived from sources other than petroleum.

Having thus described my invention, what I claim as new and desire to obtain by Letters Patent, is

1. Cyclic amidine derivatives selected from the class consisting of (A) 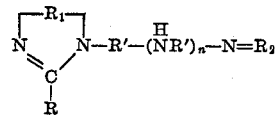

in which R is a carboxyl free residue of a monocarboxy acid; $R_1$ and R' are selected from the class consisting of

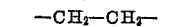

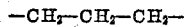

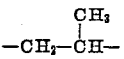

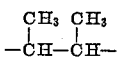

$R_2$ is the carbonyl free residue of a carbonyl compound selected from the class consisting of salicylaldehyde and vanillin; and $n$ is a numeral not over 3 and including zero;

(B)

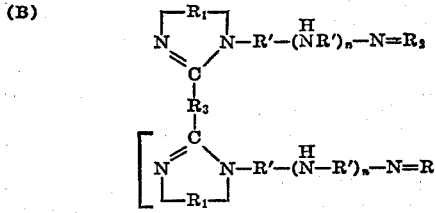

in which the various characters have their previous significance; $R_3$ is the carboxyl free radical of a polycarboxy acid having not over 4 carboxyl radicals; $n'$ is a whole number not greater than 3; (C) the hydrogenation derivatives of member (A) preceding; and (D) the hydrogenation derivatives of member (B) preceding.

2.

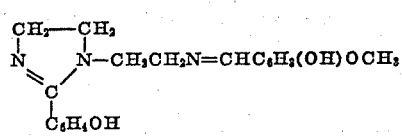

3.

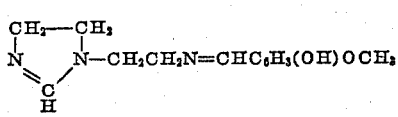

4.

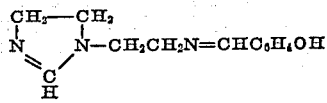

5.

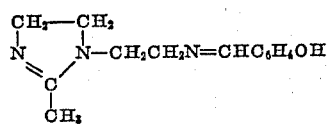

6.

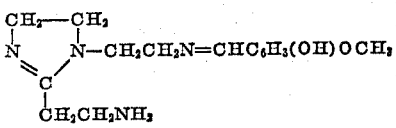

References Cited in the file of this patent
UNITED STATES PATENTS

| | | |
|---|---|---|
| 2,792,390 | Stromberg | May 14, 1957 |
| 2,819,284 | Shen | Jan. 7, 1958 |